United States Patent
Fan et al.

(10) Patent No.: US 7,877,638 B2
(45) Date of Patent: Jan. 25, 2011

(54) APPARATUS AND METHOD FOR TESTING COMPUTER

(75) Inventors: Li-Ping Fan, Shenzhen (CN); Hong-Lang Lu, Shenzhen (CN); Yu-Lin Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 279 days.

(21) Appl. No.: 12/205,129

(22) Filed: Sep. 5, 2008

(65) Prior Publication Data
US 2009/0282295 A1    Nov. 12, 2009

(30) Foreign Application Priority Data
May 6, 2008    (CN) .................. 2008 1 0301426

(51) Int. Cl.
*G06F 11/00*    (2006.01)
(52) U.S. Cl. ...................................................... 714/32
(58) Field of Classification Search ............ 714/30–32, 714/37–39, 43–46, 48, 56, 57
See application file for complete search history.

(56) References Cited

U.S. PATENT DOCUMENTS

| | | | | |
|---|---|---|---|---|
| 5,353,240 | A | * | 10/1994 | Mallory et al. ............... 702/186 |
| 5,877,956 | A | * | 3/1999 | Frank et al. .................... 700/79 |
| 6,175,774 | B1 | * | 1/2001 | Frank et al. .................... 700/79 |
| 7,475,164 | B2 | * | 1/2009 | Bai et al. ......................... 710/8 |
| 7,586,312 | B2 | * | 9/2009 | Chen et al. ................... 324/527 |
| 2007/0244663 | A1 | * | 10/2007 | Haemel et al. ............... 702/121 |
| 2008/0164883 | A1 | * | 7/2008 | Chen et al. ................... 324/511 |
| 2008/0307282 | A1 | * | 12/2008 | Dono et al. .................. 714/736 |

* cited by examiner

*Primary Examiner*—Nadeem Iqbal
(74) *Attorney, Agent, or Firm*—Clifford O. Chi

(57) ABSTRACT

An apparatus for testing a computer includes a control module having a power cycling test program and a display driving program therein, a switch module connected to the control module for receiving trigger signals generated from the power cycling test program and powering on or off the computer consequently, a driving module connected to the control module for receiving display driving signals from the display driving program, and a display module connected to the driving module for displaying test parameters. A method utilizing above described apparatus for testing the computer is also disclosed.

18 Claims, 4 Drawing Sheets

APPARATUS AND METHOD FOR TESTING COMPUTER

BACKGROUND

1. Technical Field

The present invention generally relates to an apparatus and method for testing a computer.

2. Description of Related Art

After a computer is produced, a power cycling test is required. The power cycling test is performed for a predetermined number of test cycles. In one test cycle, the computer is powered on and then powered off. A typical test procedure includes manually operating the power button of the computer repeatedly. However, manually testing the computer in a computer production line is inefficient and a waste of manpower.

An attempt to test the computers efficiently uses a mechanical arm to automatically activate a power switch of the computer. The mechanical arm periodically and repeatedly turns the computer on or off to test if the computer passes the power cycling test. However, since the atmospheric pressure acting on a piston of the mechanical arm is not constant, the mechanical arm is not a reliable apparatus to test the computer.

What is needed, therefore, is an apparatus and method for testing a computer to overcome the above-described shortcoming.

DETAILED DESCRIPTION OF THE EMBODIMENTS

Figure 1:
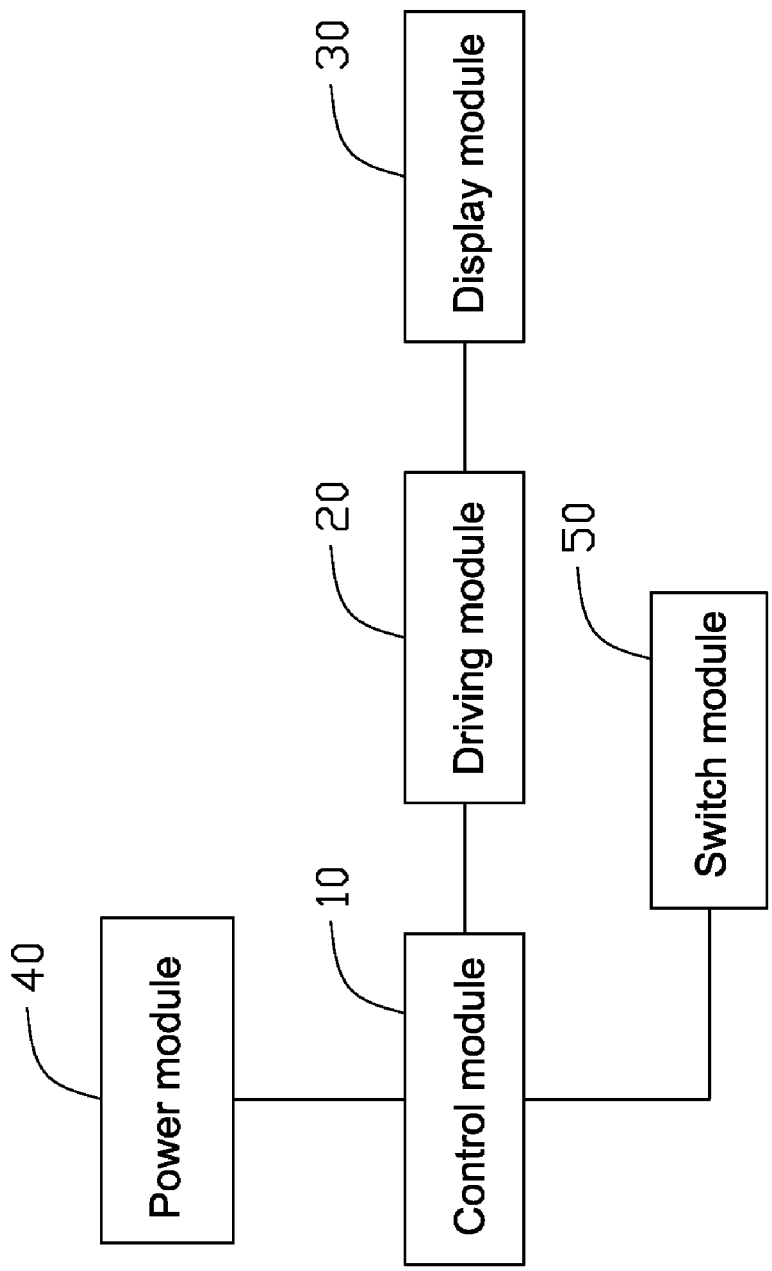
FIG. 1 is a block diagram of an embodiment of an apparatus for testing a computer, the apparatus including a control module, a driving module, a display module, a power module, and a switch module.

Referring to FIG. 1, an apparatus for testing a computer includes a control module 10, a driving module 20, a display module 30, a power module 40 for the control module 10, and a switch module 50. The control module 10 is configured to send trigger signals to the switch module 50 to periodically switch the switch module 50 on or off. The switch module 50 is configured to power the computer on or off according to the trigger signals during power cycling. Test parameters, such as cycle time and cycle number, may be displayed by the display module 30. The driving module 20 is configured to drive the display module 30 to show the test parameters.

Figure 2:
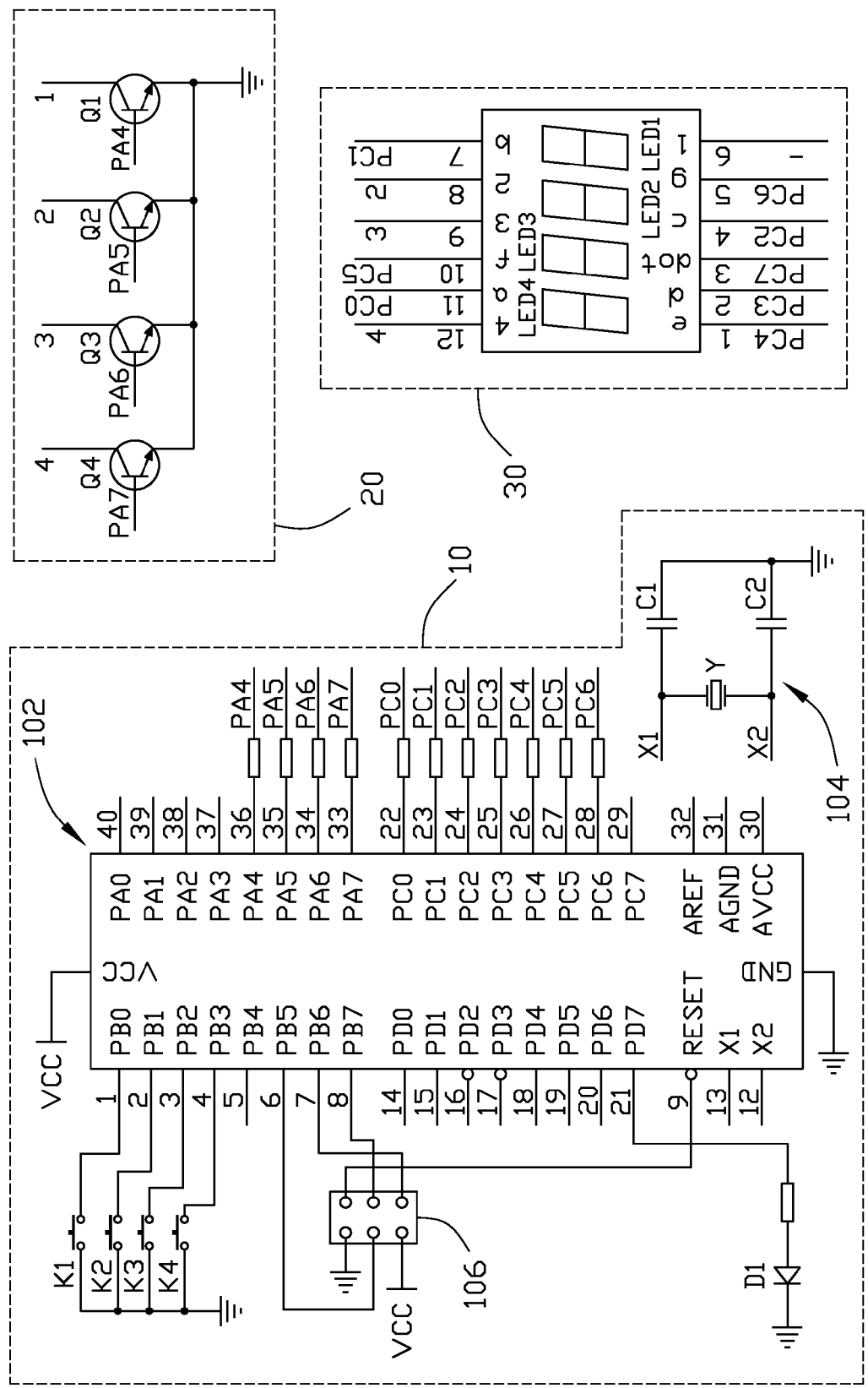
FIG. 2 is a schematic diagram illustrating detailed circuits of the control module, the driving module, and the display module of the apparatus of FIG. 1.

Referring to FIG. 2, the control module includes a microcontroller 102. In one embodiment, the microcontroller 102 is an ATMEGA16 chip which has a 16 kilobyte in-system programmable flash. The microcontroller 102 has a power cycling test program, a display driving program, and a key-scan program. A crystal oscillator circuit 104 has a port X1 and a port X2 connected to an X1 pin and an X2 pin of the microcontroller 102 to provide clock signals to the microcontroller 102. An in-system programmable connector 106 is connected to the microcontroller 102 to facilitate burn procedures to the microcontroller 102. A diode D1 is connected to a PD7 pin of the microcontroller 102 to indicate if the microcontroller 102 is operating.

A first key switch K1 is connected to a PB0 pin of the microcontroller 102 to start or stop the microcontroller 102 after it is triggered. A second key switch K2 connects to a PB1 pin of the microcontroller 102 for setting one of the test parameters after it is triggered. For example, if the key switch K2 is actuated to set the cycle time, the cycle time can be shown on the display module 30. If the second key switch K2 is actuated again to set the cycle number, the cycle number can be shown on the display module 30 instead of the cycle time. A third key switch K3 connects to a PB2 pin of the microcontroller 102 to increase a value of one of the test parameters. A fourth key switch K4 is connected to a PB3 pin of the microcontroller 102 to decrease a value of one of the test parameters. For example, if the cycle time is set and shown on the display module 30 as an initialization value of 500 seconds, the cycle time may be changed to 501 seconds after the third key switch K3 is triggered once or may be changed to 409 seconds after the fourth key switch K4 is triggered once. The third key switch K3 or the fourth key switch K4 can be triggered repeatedly to increase or decrease the cycle time to execute different power cycling tests.

The driving module 20 includes transistors Q1, Q2, Q3, Q4. A base terminal of the transistor Q1 is connected to pin PA4 of the microcontroller 102. A base terminal of the transistor Q2 is connected to pin PA5 of the microcontroller 102. A base terminal of the transistor Q3 is connected to pin PA6 of the microcontroller 102. A base terminal of the transistor Q4 is connected to pin PA7 of the microcontroller 102. Emitting terminals of the transistors Q1, Q2, Q3, Q4 are connected to ground. Collector terminals of the transistors Q1, Q2, Q3, Q4 are connected to the display module 30.

The display module 30 includes four seven-segment display LEDs 1-4 each having a pin a connected to the pin PC0 of the microcontroller 102, a pin b connected to the pin PC1 of the microcontroller 102, a pin c connected to the pin PC2 of the microcontroller 102, a pin d connected to the pin PC3 of the microcontroller 102, a pin e connected to the pin PC4 of the microcontroller 102, a pin f connected to the pin PC5 of the microcontroller 102, and a pin g connected to the pin PC6 of the microcontroller 102. A pin 1 of the display module 30 connects to the collecting terminal of the transistor Q1. A pin 2 of the display module 30 connects to the collecting terminal of the transistor Q2. A pin 3 of the display module 30 connects to the collecting terminal of the transistor Q3. A pin 4 of the display module 30 connects to the collecting terminal of the transistor Q4.

Figure 3:
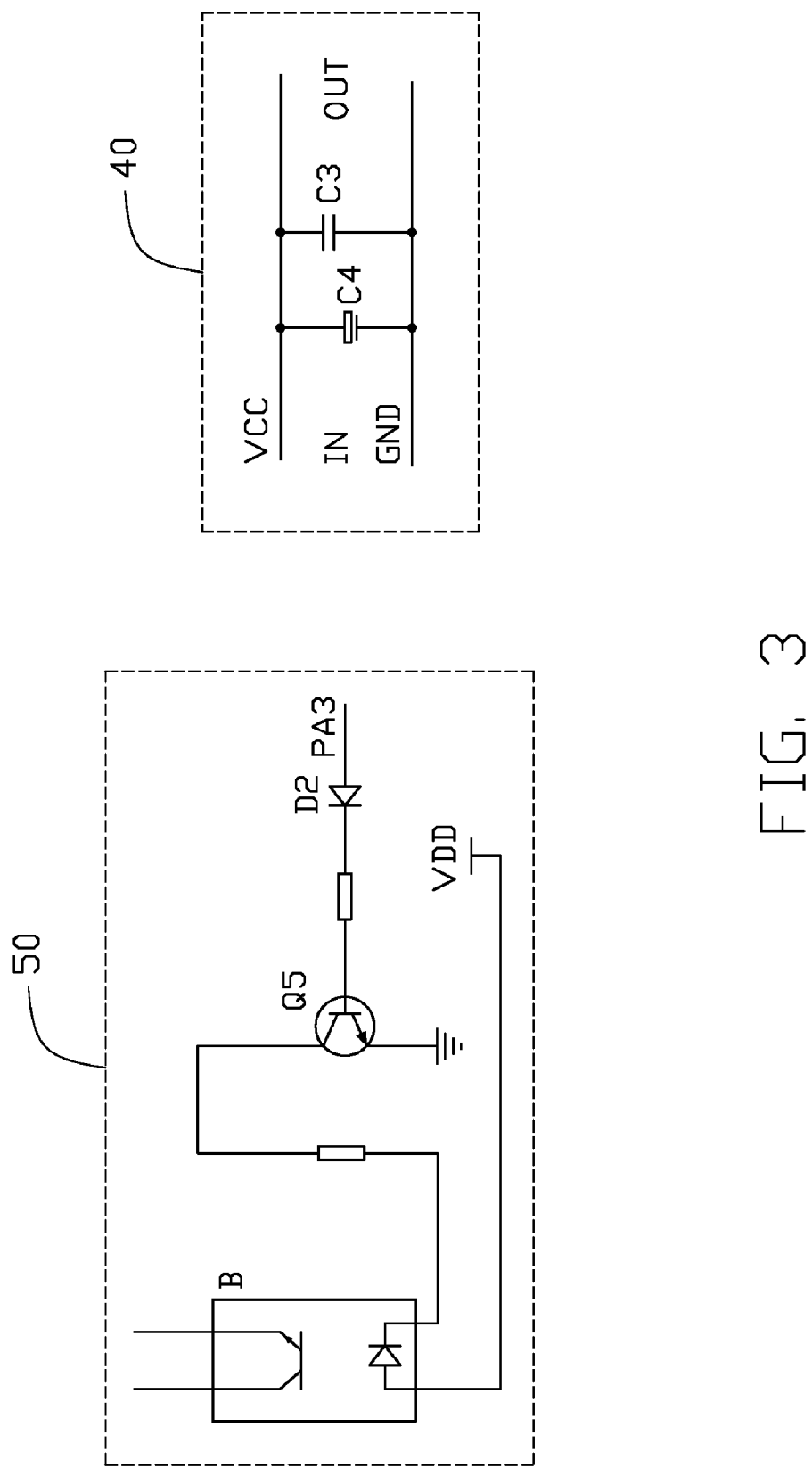
FIG. 3 is a schematic diagram illustrating detailed circuits of the power module and the switch module of the apparatus of FIG. 1.

Referring to FIG. 3, the power module 40 includes capacitors C3, C4 to regulate power output to the microcontroller 102. The switch module 50 includes a diode D2, a transistor Q5, and an optoelectron coupled devices B. An anode of the diode D2 connects to a pin PA3 of the microcontroller 102, and a cathode of the diode D2 connects to a base terminal of the transistor Q5. An emitting terminal of the transistor Q5 connects to ground. A collector terminal of the transistor Q5 connects to the optoelectron coupled device B. The optoelectron coupled device B includes a diode and a transistor connecting to a power connector of the computer to power the computer on or off according to the power cycling test program.

Figure 4:
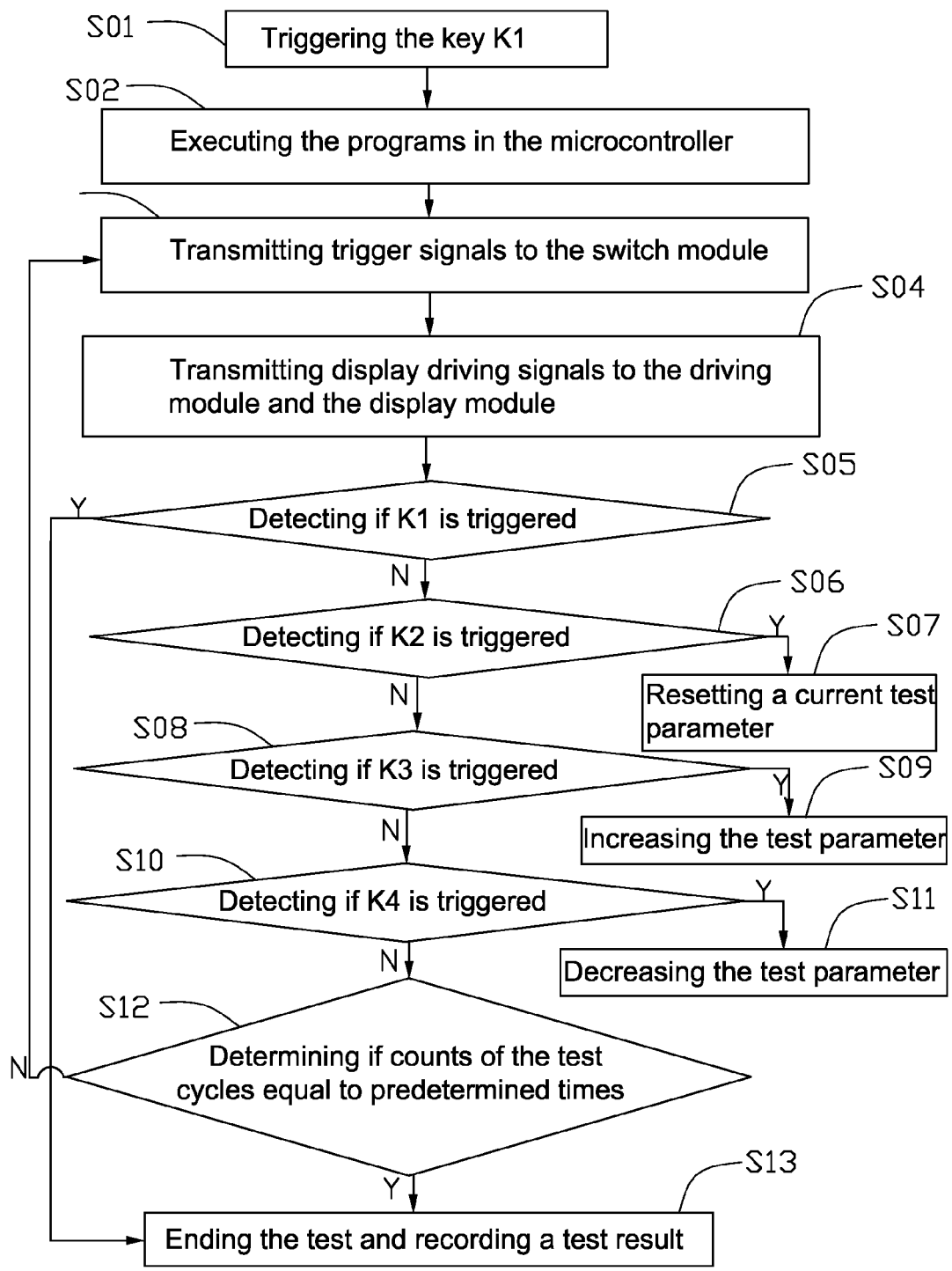
FIG. 4 is a flow chart of an embodiment of a method for testing a computer.

Referring to FIG. 4 is a method utilizing the above described apparatus for testing the computer. Depending on the embodiment, certain of the steps described below may be removed, others may be added, and the sequence of steps may be altered.

S01: triggering the key switch K1;

S02: executing the power cycling test program, display driving program, and the key-scan program in the microcontroller 102;

S03: transmitting trigger signals generated by the power cycling test program to the switch module 50 from the pin PA3 of the microcontroller 102; the optoelectron coupled device B of the switch module 50 powering the computer on or off;

S04: transmitting display driving signals to the driving module 20 and the display module 30 to show one of the test parameters which is currently enabled;

S05: detecting if the key switch K1 is triggered;

S06: if the key switch K1 is not triggered, detecting if the key switch K2 is triggered;

S07: if the key switch K2 is triggered, resetting one of the test parameters as a current test parameter which may be shown on the display module 30; for example, if the cycle time is enabled previously and shown on the display module 30, after the key switch K2 is triggered once, the cycle number is enabled and shown on the display module 30 instead of the cycle time;

S08; if the key switch K2 is not triggered, detecting if the key switch K3 is triggered;

S09: if the key switch K3 is triggered, increasing a value of the enabled parameter shown on the display module 30; for example, if the cycle number is enabled and shown as 500 on the display module 30, after the key switch K3 is triggered, the cycle number is increased to 501;

S10: if the key switch K3 is not triggered, detecting if the key switch K4 is triggered;

S11: if the key switch K4 is triggered, decreasing the value of the enabled test parameter shown on the display module 30; and S12: if the key switch K4 is not triggered, determining if a count of the test cycles is equal to a predetermined cycle number; if the count of the test cycles is less than the predetermined cycle number, continuing to transmit trigger signals to test the computer; and S13: if the count of the test cycles is equal to the predetermined cycle number, ending the test and recording a test result.

While the present invention has been illustrated by the description of preferred embodiments and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

What is claimed is:

1. An apparatus for testing an electronic equipment comprising:
   a control module having a power cycling test program and a display driving program, the control module comprising a first interface configured to transmit trigger signals generated by the power cycling test program, and a second interface configured to transmit display driving signals generated by the display driving program;
   a switch module connected to the first interface and configured to receive the trigger signals from the first interface and power the computer on or off, the switch module comprising an optoelectronic coupled device controlled by the control module, and the optoelectronic coupled device comprising a first diode and a first transistor coupled to the first diode;
   a driving module connected to the second interface and configured to receive the display driving signals; and
   a display module connected to the driving module configured to display a plurality of test parameters.

2. The apparatus of claim 1, wherein the control module further comprises a microcontroller with the power cycling test program and the display driving program therein; the microcontroller is connected to the driving module and the switch module.

3. The apparatus of claim 2, wherein the control module further comprises a first key switch connected to the microcontroller; the first key switch is configured to start or stop the programs after it is triggered by an operator.

4. The apparatus of claim 3, wherein the control module further comprises a second key switch connected to the microcontroller; the second key switch is configured to set one of the plurality of test parameters after it is triggered by the operator.

5. The apparatus of claim 4, wherein the control module further comprises a third key switch connected to the microcontroller; the third key switch is configured to increase a value of the one of the plurality of test parameters after it is triggered by the operator.

6. The apparatus of claim 5, wherein the control module further comprises a fourth key switch connected to the microcontroller; the fourth key switch is configured to decrease the value of the one of the plurality of test parameters after it is triggered by the operator.

7. The apparatus of claim 6, wherein the plurality of test parameters comprises a cycle time and a cycle number.

8. The apparatus of claim 1, wherein the switch module further comprises a second diode and a second transistor, an anode of the second diode is connected to the control module, and a cathode of the diode is connected to a base terminal of the second transistor, an emitting terminal of the second transistor is connected to ground, and a collector terminal of the second transistor is connected to the optoelectronic coupled device.

9. The apparatus of claim 1, wherein the driving module comprises a plurality of transistors connected between the control module and the display module.

10. The apparatus of claim 9, wherein the display module comprises a plurality of LED-based seven-segment displays; the plurality of transistors driving module is connected to the plurality of displays.

11. A method for testing a computer, comprising:
    executing a power cycling test program;
    transmitting on-off signals to a switch module which comprises an optoelectronic coupled device connected to the computer and a transistor connected to the optoelectronic coupled device;
    switching the transistor and the optoelectronic coupled device on or off to power the computer on or off;
    executing a display driving program; and
    transmitting display driving signals to a display module to show a plurality of test parameters.

12. The method of claim 11, further comprising executing a key-scan program for detecting if a first key is triggered to start or stop the test, if a second key is triggered to set one of the plurality of test parameters, if a third key is triggered to increase a value of the one of the plurality of test parameters, and if a fourth key is triggered to decrease the value of the one of the plurality of test parameters.

13. The method of claim 12, wherein the one of the plurality of test parameters is a cycle time.

14. The method of claim 13, further comprising increasing the cycle time if the third key is triggered.

15. The method of claim 13, further comprising decreasing the cycle time if the fourth key is triggered.

16. The method of claim 12, wherein the one of the plurality of test parameters is a cycle number.

17. The method of claim 16, further comprising increasing the cycle number if the third key is triggered.

18. The method of claim 16, further comprising decreasing the cycle number if the fourth key is triggered.

* * * * *